United States Patent [19]

Maubois et al.

[11] 3,963,837

[45] June 15, 1976

[54] PREPARATION OF CHEESE FROM ULTRAFILTERED MILK

[76] Inventors: Jean-Louis Joseph Maubois, 35 Rennes; Germain Pierre Charles Gabriel Mocquot, 78 Versailes; Louis Jean Vassal, 78 Jouy-en-Josas, all of France

[22] Filed: Feb. 27, 1974

[21] Appl. No.: 446,392

Related U.S. Application Data

[63] Continuation-in-part of Ser. No. 53,002, July 7, 1970, abandoned, and a continuation-in-part of Ser. No. 299,837, Oct. 24, 1972, and a continuation-in-part of Ser. No. 321,125, Jan. 5, 1973, Pat. No. 3,914,435, said Ser. No. 299,837, is a continuation-in-part of Ser. No. 53,002, , said Ser. No. 321,125, is a continuation-in-part of Ser. Nos. 53,002, and Ser. No. 299,837.

[30] Foreign Application Priority Data

Feb. 28, 1973 France .............................. 73.07117

[52] U.S. Cl. .................................. 426/40; 426/36; 426/471; 426/491
[51] Int. Cl.² ........................................ A23C 19/02
[58] Field of Search ................. 426/36, 40, 61, 471, 426/41

[56] References Cited
UNITED STATES PATENTS

| | | | |
|---|---|---|---|
| 1,711,032 | 4/1929 | Richardson | 426/40 |
| 2,681,858 | 6/1954 | Stimpson | 426/41 |
| 3,080,236 | 3/1963 | Ferguson, Jr. | 426/61 |
| 3,316,098 | 4/1967 | Noznick et al. | 426/40 |

OTHER PUBLICATIONS

Huton, J., *La Fromagerie De L'An 2000*, La Technaque Laitere, No. 3, 1960 (pp. 13–17).
Michaels, A. S., *Ultrafiltration*, American Corporation, Lexington, Mass., Booklet X10,905, 1968 (pp. 12–27).
Horton, et al., *Membrane Processing of Cheese Whey Reaches Commercial scale* Food Technology., vol. 26 No. 2, (pp. 30–35).

*Primary Examiner*—David M. Naff
*Attorney, Agent, or Firm*—Oblon, Fisher, Spivak, McClelland & Maier

[57] ABSTRACT

Cheese is prepared by a process which involves ultrafiltering milk to produce a milk concentrate having substantially the composition of cheese and drying the concentrate to produce a dry product which can be subsequently rehydrated to is original water content and converted into cheese. Drying can be carried out in more than one step by partially drying, adding additives such as cream, lactic starters and rennet, and then completely drying. The process eliminates conventional draining of whey, and provides a dried product which can be preserved over extended periods of time and subsequently rehydrated and converted into cheese.

6 Claims, No Drawings

PREPARATION OF CHEESE FROM ULTRAFILTERED MILK

CROSS-REFERENCES TO RELATED APPLICATIONS

This application is a continuation-in-part of our applications:
A. Serial No. 53,002, filed July 7, 1970 (now abandoned)
B. Serial No. 299,837, filed Oct. 24, 1972
C. Serial No. 321,125, filed Jan. 5, 1973, now U.S. Pat. No. 3,914,435, Application B being a continuation-in-part of Application A, and Application C being a continuation-in-part of both A and B.

BACKGROUND OF INVENTION

FIELD OF INVENTION

This invention concerns a method for processing milk in order to obtain cheese.

The main patent has for its object a method which makes it possible to obtain, starting from milk, on the one hand a liquid filtration product containing the major part of the soluble constituents of the initial milk, such as lactose, mineral salts, non-protein nitrogen substances and, on the other, a liquid containing all the casein of the initial milk, the greater part of the soluble proteins and a small part of the soluble constituents, at concentrations substantially equal to those existing in cheese prepared from milk at the end of the whey drainage process. Thus, a notable object of the invention is a method making it possible to prepare from milk, such as secreted by the milch-animal, a liquid raw material having the concentration and composition of a drained cheese.

The essential characteristic of the invention described in the main pateht is, therefore, a method for processing milk and certain dairy by-products by ultrafiltration in order to obtain a product having substantially the same composition as a cheese, but in the liquid form, the said product then being converted into cheese.

The main pateht also provides for the processing of all types of milk or dairy by-products previously used in cheese manufacture. It is possible, for example, to start with cows' goats' or ewes' milk, which may be subjected in a known manner to moderate pre-heating.

In practice, the method described in the main patent consists in contacting milk at a pressure of from 1 to 50 kg/cm$^2$ with at least one semi-permeable membrane the average pore diameter of which lies in the range of 3 to 30 m$\mu$, thus providing a first liquid, or filtration liquid passing through the said membrane, and that a second liquid or retentate is obtained which does not pass through the said membrane and having a higher concentration than the starting product, notably in proteins. The pore diameter of the semi-permeable membrane and pressure are selected so that lactose and mineral salts in the aqueous phase of the milk pass through the semi-permeable membrane in substantially the proportions they appear in the aqueous phase of the milk. Generally speaking, the retentate has a concentration in proteins, lactose, mineral salts and total solids content substantially equal to that known to exist in cheese made by renneting of a milk.

In summary, the milk product to be processed in contact with a semi-permeable membrane is placed under pressure and typically a turbulent flow and/or a laminar flow is imparted to the liquid milk product in contact with the membrane. Both types of flow agitate the liquids adjacent to the membrane and permit the obtaining of a higher content of solids in the retained liquid retentate.

The pressure applied to the milk product in contact with the membrane can be applied with a pump and/or with an inert gas under pressure, such as nitrogen.

Various types of membranes were used to prepare the retentate. Membranes available on the market are made either from polyolefines (as is the case for membranes sold under the trade name "Diaflo" by the firm Amicon, U.S.A.), or from polyacrylonitrile or polyvinylchloride (as is the case for membranes sold by the firm Rhone-Poulenc, France), or from cellulose acetate (as is the case for membranes sold by the firms De Danske Sukkerfabriker, Denmark and Abcor, U.S.A.).

The dairy product which does not pass through the membrane, or retentate, becomes more protein-enriched as the process keeps going on.

Thus, according to the main patent, the previous step may optionally be repeated (as by recycling) starting, in this case, with the said second liquid, until a liquid product is obtained which does not pass through the membrane, and the concentration of which, notably in proteins, is substantially equal to that of the cheese type food product desired.

The present invention constitutes a development of the method of the main patent in as far as the forms of conservation of the products obtained after processing the milk by ultrafiltration through the membrane are concerned.

A notable object of the invention is to allow on the one hand, said products to be conserved (kept) for a long period of time and, on the other, to facilitate their transport over long distances; even to countries which do not have raw materials suitable for cheese making and converted into cheeses in such countries.

It is known that the high water content in food products can, to a certain extent, be considered as being a nuisance on the keeping quality and the preservation of the nutritional value of products, as this high water content facilitates the development of microorganisms, chemical deterioration (autoxidations for example), the breakdown through enzymes action, among others.

Said high water content also constitutes a drawback on the level of the cost of transport of food products, as it is necessary to transport large amounts of water in proportion to the amounts of useful dry matter transported.

Therefore, at all times efforts have been made to dehydrate food products in order to store them and facilitate their transport. Spray-drying and freeze-drying are the techniques most frequently used nowadays for dehydrating food products. In the field of dairy products, whole or skimmed milk is usually dehydrated by the first mentioned technique to produce a powdered milk.

It is also known that, although it is possible for the powdered milk so obtained to regain its original concentration by adding a suitable amount of water, the conversion of said reconstituted milk into cheese is subject to a certain number of difficulties as far as coagulation with rennet (soft coagulum which is difficult to handle, and drainage of the coagulum obtained). Furthermore, such a conversion always provides cheese having organoleptic qualities which are inferior to those of cheese obtained by the conversion of the initial milk.

It is further known that it is not possible to envisage the dehydration of most types of cheese by spray-drying, as this leads to a complete destruction of the shape and texture of the cheese.

Finally, it is known that although dehydration of various types of cheese by freeze-drying is theoretically possible, its cost is prohibitive owing, first, to the thickness of said cheeses, a thickness which considerably lengthens the time required to obtain complete dehydration, and secondly, to the many difficulties which arise when rehydration is effected, or even the impossibility of such rehydration.

OBJECTS OF THE INVENTION

It is an object of the invention to overcome the aforesaid drawbacks; it relates to a method according to that of the main patent, which is characterized in dehydrating the product comprising the ultrafiltration products, this providing a dry product which may subsequently be rehydrated to its original water content and converted into cheese.

Within the meaning of the present description, the expression "product comprising the ultrafiltration product" essentially designates:

the ultrafiltration retentate the ultrafiltration retentate with added cream the "drained cheesemilk", that is to say the product comprising an ulrafiltration retentate with added cream and lactic acid bacteria starter.

the drained cheesemilk as has been defined hereinabove, with added rennet. Carrying out dehydration of liquid products which composition and concentration are adjacent to those of a drained cheese, the present invention gets rid of all the drawbacks encountered in the previously known processing methods.

The results provided by the invention are all the more unexpected in as far as the prior technique used in the dairy industry did not enable cheese of the quality required to be manufactured from powdered milk.

BRIEF DESCRIPTION OF THE INVENTION

The method of the invention can be put into effect in various manners, according to the nature of the product comprising the ultrafiltration retentate which is subjected to dehydration. Drying the retentate or drained cheesemilk does not differ markedly from drying milk in normal low heat process. When lactic acid bacteria are added to the evaporated liquid product, temperatures in the instant process at atomizer should be no more than 40°C instead of between 40 and 60 in the normal low heat process used in drying milk. When both lactic bacteria and rennet are added to the retentate, the temperature of the liquid product at atomizer should be no more than 10°C.

Dehydration can be effected in one or more steps. For example, the product to be treated can be subjected to partial vacuum evaporation at a relatively moderate temperature notably between 50° and 80°C until an intermediate dry matter content is obtained, notably 35 to 60g per 100g of said product. The product, after optional additions of the usual substances used in the technique of cheese manufacture (cream lactic starters, rennet) is then dried by spray-drying. It is also possible to treat the product comprising an ultrafiltration retentate directly in a conventional drying tower (or chamber) until the desired power is obtained. The product can thus be kept and handled in the powder form for long periods of time.

The various additives necessary for the production of cheese can be introduced at any stage of the method the following order: cream, lactic starters and rennet. The lactic starters can be added in a concentrated form or as a normal culture. The rennet is a normal calf rennet or any other coagulating enzyme.

The various modes of carrying out the new method all provide a dry product which can be stored at room temperature for a long period of time (3 months, 6 months, 1 year or longer) and can also be transported at low cost over long distances.

According to its composition, said dry product can be converted into cheese after rehydration, either directly or after being mixed with the usual additives (cream, lactic starters, rennet). The amount and nature of the additives obviously depend on the amount of cheese to be made, as is well known to a man skilled in the cheese making art. The following considerations, and the illustrative examples given hereinafter, provide him with all the necessary indications. Furthermore, the descriptions in the main patent (French Pat. No. 69 24 555) and the first certificate of addition (French Addition No. 71 38 091) can be taken as bibliographical references defining the methods for converting a liquid retentate into cheese. According to the present invention, the product comprising ultrafiltration retentate, available in the dry powder form, has water added thereto to convert it into a liquid product which can then be used directly for the manufacture of cheese according to the instructions of the aforesaid main patent and first certificate of addition.

As an example, the process of the invention can comprise the following steps:

1a) Spray drying of the ultrafiltration retentate with or without previously added cream 1b) subsequent rehydration of the dry product obtained in 1a)

1c) conversion into cheese of the said rehydrated product obtained in 1b).

As a variant, the process of the invention can comprise the following steps:

2a) partial vacuum evaporation of the ultrafiltration retentate, with or without previously added cream, 2b) addition of a lactic acid bacteria starter 2c) spray drying of the product obtained in 2b)

2d) subsequent rehydration of the dry product obtained in 2c)

2e) conversion into cheese of the rehydration product obtained in 2d.

According to another variant, the process of the invention can comprise the following steps:

3a) partial vacuum evaporation of the ultrafiltration retentate, with or without previously added cream, which provides a drained cheesemilk.

3b. addition of lactic starters to the drained cheesemilk;

3c. the addition of rennet to the product obtained in 3b) heated to, or maintained at, a temperature lower than 13°C, thus providing a renneted drained cheesemilk.

3d. drying the product obtained in 3c) by spray drying, this providing a renneted and dried drained cheesemilk.

3e. subsequent rehydration of the dry product obtained in 3d;

3f. conversion into cheese of the rehydrated product obtained in 3c.

It is obvious that the aforesaid methods of embodiment have only been given by way of explanation. Additional variants implying other successions of steps, or a different number of steps, are within the capacity of a man of the art and do not depart from the invention.

In the case of the addition of cream to the liquid ultrafiltration retentate, immediately prior to drying or after rehydration of the dry retentate, the rules of the art should be respected when choosing the relative amounts of retentate and cream according to the type of cheese to be manufactured.

The aim of the description which follows is to provide a man of the art with all the useful indications to determine the various factors coming into play in the method, notably the amount of cream to be added, according to the type of cheese to be manufactured.

The following definitions are used:

$x$ will designate the amount of cream to be added to 1 kg of retentate $r$ the dry matter content of the retentate $y$ the dry matter content of the cream $c$ the fat content of the cream $m$ the ratio fat: dry matter of the drained cheesemilk $p$ the dry matter content of the drained cheesemilk.

The following relationships exist between the parameters defined hereinabove:

1. $(1+x) p = r + xy$ $$m = \frac{xc}{(1+x)p} = \frac{x.c}{r+xy} \quad (2)$$

3. $y = c + (100 - c) \, 0.09$ if the dry matter content of the skim milk is taken as being about 9 g per 100 g of skim milk.

equation (3) gives:
$y = 1c + 9 - 0.09 \, c$
$y = 0.91 \, c + 9$ equation (1) gives:
$p + px = r + x \, (0.91 \, c + 9)$
$p - r = x \, (0.91 \, c + 9 - p)$ $$x = \frac{p - r}{0.91 \, c - p + 9}$$

It is calculated from equation (2) that:
$m.p. \, (1 + x) = x.c$
$m.p. + m.p.x = x.c$
$m.p. = x \, (c - m.p)$ hence $m.p = \frac{p - r}{0.91 \, c - p + 9} (c - m.p)$ $m.p \, (0.91 \, c - p + 9) = (p - R)(c - m.p)$
$0.91 \, c.m.p - m.p^2 + 9 \, m.p = p.c - m.p^2 - r.c + r.m.p$
$0.91 \, c.m.p - p.c + r.c = r.m.p - 9 \, m.p$
$c(0.91 \, m.p - p + r) = m.p \, (r - 9)$ $$c = \frac{m.p \, (r - 9)}{0.91 \, m.p - p + r}$$

$p(0.91 \, c.m - c - r.m + 9 \, m) = - r.c$
$p(c + r.m = 9 \, m - 0.91 \, c.m) = r.c$
$p \, [c + m \, (r - 9 - 0.91 \, c)] = r.c$ $$p = \frac{r.c}{c - m(9 + 0.91 \, c - r)}$$

$m(0.91 \, c.p - r.p + 9 \, p) = p.c - r.c$ $$m = \frac{c \, (p - r)}{p \, (0.91 \, c - r + 9)}$$

By way of explanation, in the case of a fresh homogenized curd, the following particular values are given:

$p = 19$      $m = 0.4$
$r = 13$

It is calculated that $$c = \frac{0.4 \times 19 \times 4}{0.91 \times 0.4 \times 19 - 19 + 13} = \frac{30.4}{0.916} = 33.2$$

In the case of a Camenbert type soft cheese, the following particular values are chosen:

$r = 25$      $m = 0.4$
$c = 54$

It is calculated that $$p = \frac{25 \times 54}{54 - 0.4 \, (9 + 0.91 \times 54 - 25)} = 33.1$$

As an example, in the case of a fresh cheese having a dry matter content of 19g per 100 g of cheese and a fat content in the dry matter of 40g per 100 g of cheese, 29.57 kg of cream having a fat content of 33.3g per 100 g of cream will be added to 100 kg of ultrafiltration retentate having a dry matter content of 13 g per 100 g of ultrafiltration retentate.

Still by way of example, in the case of a soft cheese having a dry matter content, when put on the market, of 48g per 100 g of cheese and 46 per 100 fat content in the dry matter, 35,5 kg cream having a fat content of 50 g per 100g of cream will be added to 100 kg of ultrafiltration retentate having a dry matter content of 25g per 100.

Moreover, rehydration of the dry products obtained after any of the aforesaid drying steps is effected by the addition of water until the water content of the product prior to drying is obtained. The amount of water to be added therefore depends directly on the water content of the original product. Another factor to be taken into consideration is the temperature of the water. This temperature should be adapted to the type of cheese to be manufactured.

Thus, for a fresh cheese, the temperature of the rehydration water will be between 18° and 22°C.

For a soft cheese, the temperature of the water used for rehydrating the dry product comprising the ultrafiltration retentate will be situated in the range of 28° to 35°C.

The present invention provides surprising and important practical advantages.

The coagulum obtained after the action of the rennet of said products is as firm as that obtained by the action of rennet on the initial liquid cheese liquid cheesemilk.

The organoleptic qualities of the cheese obtained are identical to those of cheese obtained from the initial cheesemilk.

ADVANTAGES OF INSTANT PROCESS

Owing to the present invention, it becomes possible to manufacture cheese in all countries which do not have a dairy industry. It gets rid of all the drawbacks connected with the use of dry milk powder, the difficulties in finding the considerable sums necessary for installing manufacturing and draining rooms, and in finding qualified and competent technicians in developing countries. It avoids pollution with whey in the same countries.

It also becomes possible, even in industrialized countries, to store for future use the raw material intended to be used for conversion into cheese, which is particularly important for the milk of animals whose production is seasonal (goat and ewe), but which can also be useful and advantageous for cows' milk by enabling cheese manufacture to be adapted to consumer's demand.

It is not departing from the scope of the present invention if, instead of dairy cream, fats of another animal origin such as the fat obtained from copra, groundnuts, soya, cottonseed etc, are added to the ultrafiltration retentate, or to the product comprising the retentate. This variant of the invention can be particularly advantageous in developing countries whose inhabitants are used to consuming these low cost fats.

EXAMPLE 1

650 kg of raw skimmed milk having a drymatter content of 9.0 g of dry matter per 100g of skimmilk and nitrogen matter content of 3.5 g per 100 g of skimmilk, were placed in a constant temperature vat. The temperature of the milk was 2°C. The milk was circulated in an ultrafiltration apparatus or device manufactured by the firm RHONE-POULENC, provided with a membrane with pore sizes previously described and a surface of 4m2, using a pump delivering 6000 liters of milk per hour. The input pressure of the device was 3.5 kg/cm2, the outlet pressure was 1.6 kg/cm2. Recirculation of the liquid not passing through the membranes was maintained for 20 hours 25 minutes. When the weight of liquid having passed through the membranes reached a level of 358.5 kg circulation was stopped and the ultrafiltration retentate was recovered. It had a dry matter content of 13.2 g per 100 g of ultrafiltration retentate, and a nitrogen matter content of 7,0g per 100g of ultrafiltration retentate. 300 kg Of said retentate was concentrated by partial vacuum evaporation at 69°C in a "LAGUILLHARRE" Evaporator.

The concentrate obtained (dry matter content 36.9 g per 100 g of concentrate) was separated into three fractions of equal volume. Its temperature was 10°C.

500g of concentrated lactic starter was added to one of said fractions and the same weight of concentrated lactic starters and 1.3 ml liquid rennet (strength 1/10.000) were added to another. The third fraction received no addition.

The three fractions were then dried successively in a drying tower with a so called "Anhydro" spray drying system, wherein the drying parameters were as follows:
  inlet temperature of air: 182°C
  outlet temperature of air: 81°C
The powders obtained had the following characteristics dry matter conent: 94,0 g per 100g of powder
nitrogen matter content: 52.5 g per 100 g of powder
They were stored, without any special precautions, at laboratory temperature.

Aliquot fractions of each powder were transported after being kept for 2 months and were converted into fresh cheese under the following conditions:
  a. 1.38 kg of each type of powder were brought to 10kg with a sufficient amount of water at 20°C. In the fraction of powder which had received no addition, 1.5g of lactic cheese starter "Flora Danica" per 100g of reconstituted product and 0.5ml of rennet, strength 1/10.000, were added successively.

0.5 ml of rennet, strength 1/10.000, was added to the fraction of powder obtained from the concentrate with lactic starters added. The three solutions were then carefully mixed and left to stand for 17 hours at ambient temperature (20°C).

The coagulums obtained were cut and 2.96 kg cream having a fat content of 33.3 g per 100 was added to each. Each mixture was homogenized in a conventional homogenizer. The products obtained were put into pots and stored at 4°C.

The organoleptic qualities of the cheeses obtained were equivalent to those found in cheese obtained from nondried ultrafiltration retentates.

EXAMPLE 2

600 kg of raw skimmed milk cooled to 2°C was poured into a constant temperature vat. The milk had a dry matter content of 9.2g per 100 g of milk and a nitrogen matter content of 3.6g per 100 g of milk. The milk was circulated by a pump delivering 28 liters/minute and ultrafiltrated in an ultrafiltration apparatus or device manufactured by the Danish firm "D.D.S." provided with a membrane having pore sizes previously described and a surface area of 4 m$^2$ (membranes of the type D.D.S. 600). The inlet pressure of the device was 2.5 kg/cm$^2$ and the outlet pressure 1.5 kg/cm$^2$. When the weight of the ultrafiltrate which had been flowing out had reached 383.4 kg, the liquid pressure at the inlet to the device was progressively raised to 9.5 kg/cm$^2$. The temperature of the ultrafiltration retentate was raised from 2°C in 20 minutes by means of the heat exchanger positioned in the circuit. The liquid pressure at the device inlet was lowered to 3.5 kg/cm$^2$. Ultrafiltration was carried out for 3 hours 20 minutes. 479.4 kg of ultrafiltrate was then obtained.

100 kg of ultrafiltration retentate was taken and cooled to 8°C. The composition of the ultrafiltration retentate (U.R.) was as follows:
  dry matter content: 25,2 g per 100 g of U.R.
  nitrogen matter content: 18.7 g per 100 g of U.R.
These 100 kg were dried directly in an Anhydro tower, the drying parameters being as follows:
  air inlet temperature: 182°C
  air outlet temperature: 80°C
The powder obtained had the following characteristics:
  dry matter content: 96.4g per 100
  nitogen matter content: 71.1 g per 100

EXAMPLE 3

600 kg of raw skimmed milk cooled to 2°C was poured into a constant temperature vat. The dry matter content of the milk was 9.2g per 100 g of milk and its nitrogen content 3.3 per 100 g of milk.

The milk was circulated by means of a pump delivering 28 liters/minute, and ultrafiltrated through a D.D.S. device equipped with a 4 m$^2$ membrane type D.D.S. 600. The liquid pressure in the device was 3 kg/cm2 at the inlet and 1.5 kg/cm2 at the outlet. 19 hr 30 minutes after the start of the trial, 426.8 kg ultrafiltrate had been recovered. The liquid pressure at the outlet of the device was unchanged, but the input pressure was 10 kg/cm2. The temperature of the ultrafiltration retentate was raised to 50°C in 25 minutes, the input pressure then dropped to 3.5kg/cm2. When a total of 501.3 kg of ultrafiltrate had been obtained, ultrafiltration was stopped and the ultrafiltration retentate (U.R.) collected and cooled. It had the following composition:

dry matter content: 26.4 g per 100g of U.R.
nitrogen matter content: 18.2 g per 100g of U.R.

40.3 kg Cream having a fat content of 40.4 g per 100 was added to 59.7 kg of the retentate.

After mixing, the composition of the product obtained was as follows:

dry matter content: 34.2 g per 100 g of product
nitrogen matter content: 13.4 g per 100 g of product
fat content: 16.7 g per 100 g of product Said product was dried, after homogenization of the mixture at 200 kg/cm2 in an Anhydro tower (air inlet temperature: 181°C, air outlet temperature: 80°C.

The composition of the powder obtained was as follows:

dry matter content: 97.7 g per 100 of powder
nitrogen matter content: 38.5 g per 100 of powder
fat content: 47.6 g per 100 of powder.

EXAMPLE 4

7.4 kg Water at 35°C was added to 2.60 kg of the powder obtained in example 2. When completely dissolved, 8.3 kg of cream having a fat content of 51.9 g per 100 was added and carefully mixed. The temperature of the mixture was 28°C. 0.2 kg of a lactic starter Flora Danica was added. The drained cheese milk so obtained was maintained at 28°C. When a pH of 5.9 was obtained, 1.4 ml of rennet, strength 1/10.000 was added. After careful mixing, doses of 350 g of the drained cheese milk were poured into Camenbert shape and size moulds. Coagulation occurred 17 minutes after the addition of rennet. 60 minutes after the addition of rennet the cheeses were turned over and placed on slats. The subsequent manufacturing operations were the same as in the conventional technique.

The same operation was repeated after the powder has been kept at ambient temperature for 4 months.

In each case Camembert type cheeses having excellent organoleptic qualities were obtained.

EXAMPLE 5

6.5 kg Water at 32°C was added to 3.5 kg of the powder obtained in example 3 the day after the drying operation. After careful, gentle stirring to avoid any churning phenomenon, 0.2 kg of a lactic starter Flora Danica was added. The drained cheesemilk thus obtained was maintained at a temperature in the range of 28°C to 32°C. 1.2 ml of rennet, strength 1/10.000, was added when the pH reached 6.1. After careful mixing, doses of 350g of the pre-cheese were distributed into Camembert shape and size moulds.

Coagulation occurred 23 minutes after the addition of the rennet. 65 Minutes after the addition of the rennet the cheeses were turned over and placed on slats. The subsequent manufacturing operations were the same as those of the conventional technique.

The same operation was repeated after the powder had been kept at ambient temperature for 4 months.

In each case Camember type cheeses having excellent organoleptic qualities were obtained.

The dried retentate, as illustrated in the Examples, should have at least about 94 parts of dry matter per hundred parts of powder, and preferably at least 95 parts per 100 parts. Where fats are added to the retentate, the powder should have at least 96 parts of dry matter and preferably at least 97 parts.

In the preceding Examples, freeze drying may replace the techniques used, but is considered too costly.

In general, the apparatus used in the preceding Examples are of the conventional type used in the evaporation or spray drying of milk, care being taken to avoid temperatures sufficiently high to degrade the retentate, particularly the whey soluble proteins. Likewise, where other cheeseforming ingredients are added to the retentate before drying to form a drained cheesemilk before dehydrating the enable one to convert the product into a cheese upon rehydrating, drying temperatures should be avoided which will adversely effect the functioning of such added ingredients.

In general, the apparatus used in the preceding examples are the conventional type used in the evaporation or the spray drying of milk.

For instance, the "LAQUILLHARRE" Evaporator and and Anhydro spray drying system set out in the examples have the characteristics set out below.

The evaporing unit used is a single effect falling film evaporator with incorporated finisher and with steam thermocompressor. Evaporating potential:350kgs of water per hour.

The vacuum in the evaporator must be above 900 millibars, preferably about 950 millibars.

Temperature ranges are as follows:
a. preheating (evaporator inlet) 40°C to 85°C, preferably between 40°C and 65°C, such to avoid any denaturation of soluble proteins.
b. in the vacuum unit (evaporation temperature) 40°C to 60°C
c. in the condenser 50°C to 80°C The temperature of the milk is generally considered as being, at the most, equal to the average of the temperatures in the vacuum unit and in the condenser.

The spray drying tower is cylindro-conical in shape. The cylinder has a diameter of 2.5 meters and a height of 2 meters the conical part (50° angle) has a height of 2 meters rotating speed of turbine between 12 000 and 18 000 R.P.M. for retentate 12 000 to 14 000 R.P.M. and drained cheese milk 16 000 to 18 000 R.P.M.

The dry matter content of the various products falling in the scope of the invention are set out below:
a. For evaporated retentate or drained cheese milk: between 35 and 60 p.100, preferably between 45 and 50 p.100 and as close as possible to 50 p.100
b. for dried retentate or drained cheesemilk (in the form of powders)
b1. dried "retentate": above at least 94 p.100 and preferably at least above 95 p.100
b2. dried drained "CHEESEMILK" (i.e. "retentate" + added fat): above at least 96 p.100 and preferably at least above 97 p.100.

We claim:

1. A method for making a cheese from milk, which comprises:

separating said milk into a first liquid filtrate component and a second retained liquid retentate component by contacting said milk with a semi-permeable membrane, the average pore diameter of which is from 3 to 30 m$\mu$, at a pressure of from 1 to 50 kg/cm$^2$, said first liquid filtrate component passing through said semi-permeable membrane and said second liquid retentate not passing through said semi-permeable membrane, said second liquid retentate having a higher concentration of proteins than said first liquid component, said semi-permeable membrane and said pressure as set forth above being selected so that the lactose and mineral salts in the aqueous phase of the milk pass through the semi-permeable membrane in substantially the proportions they appear in said aqueous phase of said milk;

maintaining and continuing contact of said second liquid retentate at said pressure and under agitated conditions adjacent said membrane until a filtrate has been separated in substantial amount, and a liquid milk retentate is obtained having protein, lactose, and mineral salt contents substantially equal to that known to exist in a desired organoleptically acceptable cheese;

partially drying said second liquid retentate and adding lactic starter thereto at a temperature less than 13°C;

drying said partially dried retentate containing said starter; and rehydrating said dried retentate and transforming said rehydrated product into cheese by the addition of rennet thereto.

2. A method for making a cheese from milk, which comprises:

separating said milk into a first liquid filtrate component and a second retained liquid retentate component by contacting said milk with a semi-permeable membrane, the average pore diameter of which is from 3 to 30 m$\mu$, at a pressure of from 1 to 50 kg/cm$^2$, said first liquid filtrate component passing through said semi-permeable membrane and said second liquid retentate not passing through said semi-permeable membrane, said second liquid retentate having a higher concentration of proteins than said first liquid component, said semi-permeable membrane and said pressure as set forth above being selected so that the lactose and mineral salts in the aqueous phase of the milk pass through the semi-permeable membrane in substantially the proportions they appear in said aqueous phase of said milk;

maintaining and continuing contact of said second liquid retentate at said pressure and under agitated conditions adjacent said membrane until a filtrate has been separated in a substantial amount, and a liquid milk retentate is obtained having protein, lactose and mineral salt contents substantially equal to that known to exist in a desired organoleptically acceptable cheese;

partially drying said second liquid retentate and adding thereto rennet at a temperature less than 13°C and a lactic starter;

drying said partially dried retentate containing starter and rennet;

rehydrating said dried retentate by adding water thereto, and converting said rehydrated retentate into cheese.

3. The method according to claim 2, wherein said partial drying is effected by partial vacuum evaporation.

4. The method according to claim 2, wherein said partially dried retentate is dried by spray drying.

5. The method according to claim 2, wherein cream is added to said retentate prior to said partial drying.

6. The method according to claim 2, wherein said retentate is dehydrated to a level of at least 94% of dry matter.

* * * * *

UNITED STATES PATENT AND TRADEMARK OFFICE
CERTIFICATE OF CORRECTION

PATENT NO. : 3,963,837
DATED : June 15, 1976
INVENTOR(S) : Jean-Louis Joseph Maubois et al It is certified that error appears in the above–identified patent and that said Letters Patent are hereby corrected as shown below:

Cover page, Column 1, insert

--[73[ Assignee: Institut National De LA Recherche

Agronomique

Signed and Sealed this

Seventh Day of September 1976

[SEAL]

Attest:

RUTH C. MASON
*Attesting Officer*

C. MARSHALL DANN
*Commissioner of Patents and Trademarks*